(12) United States Patent
Pinarbasi

(10) Patent No.: US 7,283,334 B2
(45) Date of Patent: Oct. 16, 2007

(54) METHOD FOR FABRICATING SEED LAYER FOR SPIN VALVE SENSOR FOR MAGNETIC HEADS FOR HARD DISK DRIVES

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 11/455,204

(22) Filed: Jun. 15, 2006

(65) Prior Publication Data

US 2006/0236526 A1 Oct. 26, 2006

Related U.S. Application Data

(62) Division of application No. 09/900,688, filed on Jul. 6, 2001, now Pat. No. 7,092,219.

(51) Int. Cl.
*G11B 5/33* (2006.01)
*G11B 5/127* (2006.01)

(52) U.S. Cl. .............. 360/324.1; 360/324; 360/324.11; 360/324.12; 29/603.01; 29/603.07

(58) Field of Classification Search ............. 360/324.1, 360/324.11, 324.12; 39/603.08; 29/603.08, 29/603.07, 603.01
See application file for complete search history.

(56) References Cited

U.S. PATENT DOCUMENTS 5,849,422 A 12/1998 Hayashi
5,850,323 A 12/1998 Kanai
5,869,963 A 2/1999 Saito et al.
5,896,252 A 4/1999 Kanai
6,046,892 A 4/2000 Aoshima et al.
6,411,476 B1 6/2002 Lin et al.
6,430,014 B1 8/2002 Gill (Continued)

FOREIGN PATENT DOCUMENTS

JP 8315326 11/1999

OTHER PUBLICATIONS

Research Disclosure, Apr. 2000, "Lower HC Through Surface Modification." Disclosed by International Business Machines Corporation 432117.

*Primary Examiner*—Angel Castro
*Assistant Examiner*—Christopher R. Magee
(74) *Attorney, Agent, or Firm*—Intellectual Property Law Offices; Robert O. Guillot

(57) ABSTRACT

A magnetic head having a spin valve sensor that is fabricated utilizing an $Al_2O_3$, NiMnO, NiFeCr seed layer upon which a typical PtMn spin valve sensor layer structure is subsequently fabricated. The preferred embodiment fabrication process of the NiFeCr layer includes the overdeposition of the layer to a first thickness of from 15 Å to 45 Å followed by the etching back of the seed layer of approximately 5 Å to approximately 15 Å to its desired final thickness of approximately 10 Å to 40 Å. The Cr at. % composition in the NiFeCr layer is preferably from approximately 35 at. % to approximately 46 at. %. The crystal structure of the surface of the etched back NiFeCr layer results in an improved crystal structure to the subsequently fabricated spin valve sensor layers, such that the fabricated spin valve exhibits increased ΔR/R and reduced coercivity.

11 Claims, 2 Drawing Sheets

U.S. PATENT DOCUMENTS 6,452,763 B1 * 9/2002 Gill ..................... 360/324.11
6,490,140 B1    12/2002 Mao et al.
6,501,626 B1 * 12/2002 Gill ..................... 360/324.11
6,560,078 B1 *  5/2003 Pinarbasi ............... 360/324.11
6,580,588 B1 *  6/2003 Gill ..................... 360/324.1
6,594,123 B1 *  7/2003 Gill et al. ............. 360/324.12
6,621,665 B1 *  9/2003 Gill ..................... 360/324.11
6,667,616 B1   12/2003 Skukh et al.
6,674,616 B2    1/2004 Gill

* cited by examiner

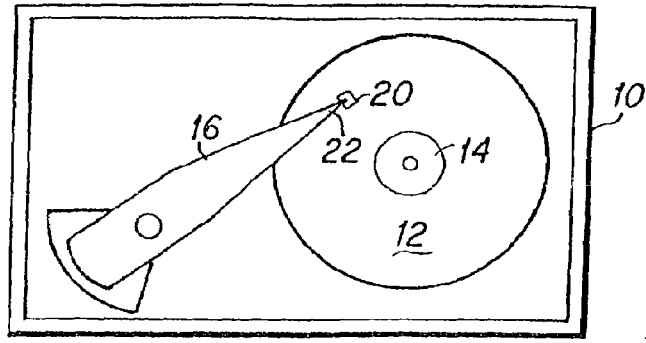
Fig. 1
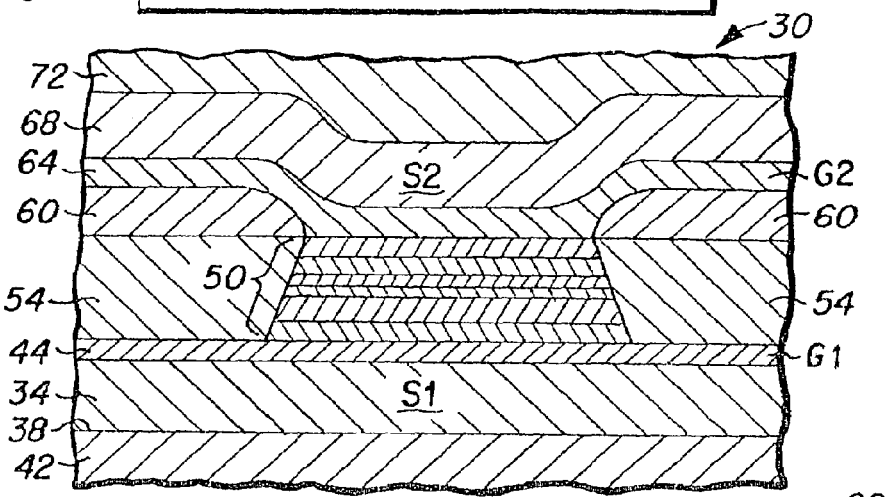
Fig. 2 (PRIOR ART)
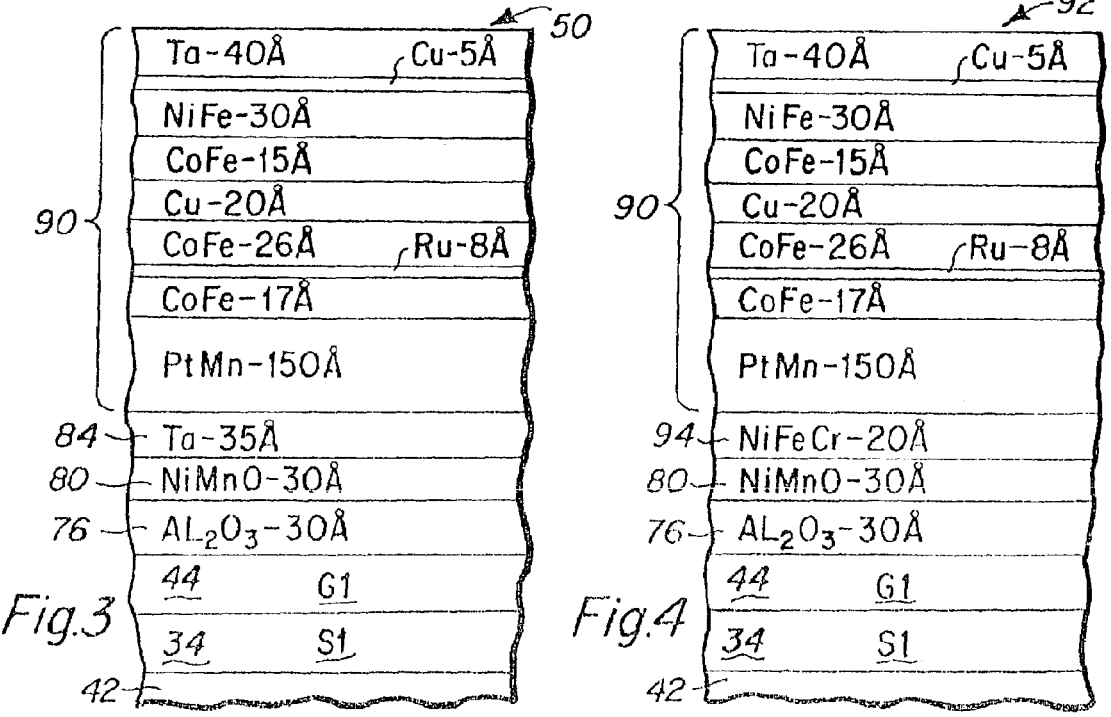
Fig. 3
Fig. 4

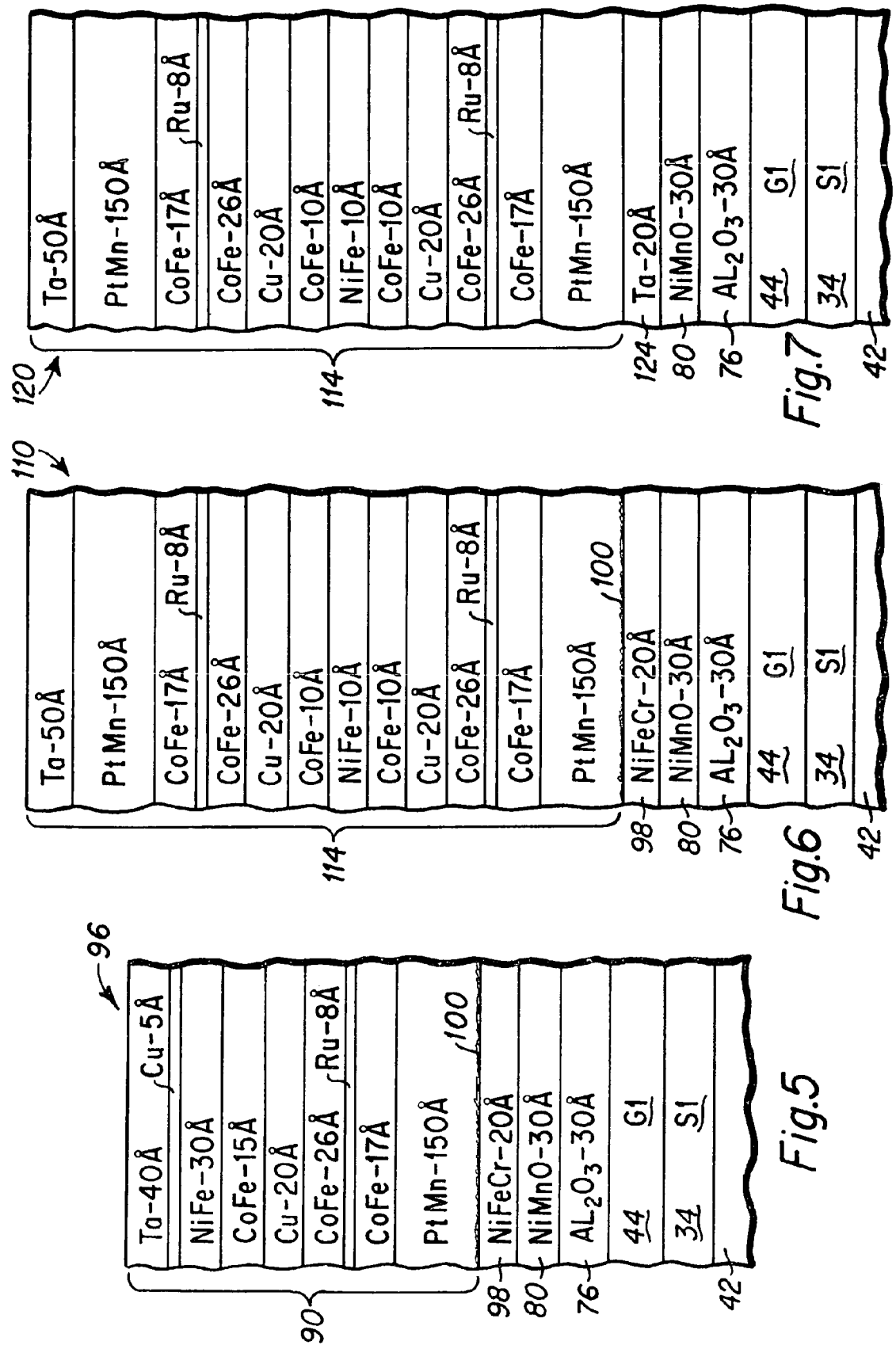

METHOD FOR FABRICATING SEED LAYER FOR SPIN VALVE SENSOR FOR MAGNETIC HEADS FOR HARD DISK DRIVES

BACKGROUND OF THE INVENTION

1. Field of the Invention

The present invention relates generally to spin valve sensors for magnetic heads, and more particularly to an improved NiFeCr seed layer for a PtMn spin valve sensor structure.

2. Description of the Prior Art

Magnetic heads for hard disk drives typically include a magnetoresistive read head element for reading data from the disk of the hard disk drive. The present invention specifically relates to the use of a spin valve sensor structure as the magnetoresistive element. As is well known to those skilled in the art, such spin valve sensor structures include a plurality of thin film layers having particular magnetic properties, and which are sensitive to the magnetic field of the data bits of a hard disk. A typical spin valve sensor will include at least one antiferromagnetic layer, at least one pinned magnetic field layer, and at least one free magnetic field layer. When the magnetic field direction of the free magnetic field layer is parallel to the magnetic field direction of the pinned magnetic field layer, the electrical resistance R of the spin valve sensor is lowest. When reading data, a magnetic data bit of a hard disk will cause the magnetic field direction of the free magnetic field layer to change, whereupon the electrical resistance of the spin valve sensor increases. This change in resistance ($\Delta R$) affects the electrical current passing through the spin valve sensor, and is thus detected as a data signal. It is desirable to develop spin valve sensors having an increased $\Delta R/R$ value, as such spin valve sensors are generally more sensitive. Another parameter that is significant in spin valve sensor performance is the free layer coercivity of the spin valve sensor, and generally, the lower the coercivity, the more stable the spin valve sensor will be.

Many different materials have been utilized in the prior art in attempts to increase $\Delta R/R$ and reduce the coercivity of the spin valve sensor. The present invention relates to a spin valve sensor that is fabricated utilizing a particular seed layer composed of NiFeCr, together with a seed layer etching process step which affects the crystalline surface structure of the seed layer. An improved crystalline structure within the spin valve sensor layers deposited upon the seed layer is thereby created which results in a more desirable spin valve sensor having an increased $\Delta R/R$ together with a reduced coercivity.

SUMMARY OF THE INVENTION

The spin valve sensor of the present invention is fabricated utilizing a three part $Al_2O_3$, NiMnO, NiFeCr seed layer upon which a typical PtMn spin valve sensor layer structure is subsequently fabricated. A preferred fabrication process of the seed layer includes the sequential deposition of the three parts of the seed layer in a vacuum chamber, and it further may include the overdeposition of the NiFeCr layer beyond its desired thickness, followed by the etching back of the NiFeCr layer to its desired thickness. Thereafter, the typical PtMn spin valve sensor layers are subsequently fabricated upon the NiFeCr layer. Regarding the etched back NiFeCr layer embodiment, it is believed that the crystal structure of the surface of the etched back NiFeCr layer is altered by the etching process, and it results in an improved crystal structure to the subsequently fabricated spin valve sensor layers, such that the fabricated spin valve exhibits increased $\Delta R/R$ and reduced coercivity.

In the preferred etched back NiFeCr layer embodiments, the NiFeCr layer is deposited to a first thickness of from 15 Å to 45 Å and is etched back from approximately 5 Å to approximately 15 Å. In a particular embodiment, the NiFeCr layer is deposited to an initial thickness of approximately 30 Å and is etched back a thickness of approximately 10 Å to achieve a final thickness of approximately 20 Å. The Cr at. % composition in the NiFeCr layer is preferably from approximately 35 at. % to approximately 46 at. % with a preferred composition of approximately 38 at. %. A preferred NiFeCr layer composition is $Ni_{49.5}Fe_{12.5}Cr_{38}$.

It is an advantage of the magnetic head of the present invention that it includes a spin valve magnetoresistive read head having an increased $\Delta R/R$.

It is another advantage of the magnetic head of the present invention that it includes a magnetoresistive read head having a reduced coercivity.

It is a further advantage of the magnetic head of the present invention that it includes a three part $Al_2O_3$, NiMnO, NiFeCr seed layer.

It is yet another advantage of the magnetic head of the present invention that it includes a magnetoresistive read head including an NiFeCr seed layer portion having an improved upper surface crystalline structure that results in a spin valve sensor having an increased $\Delta R/R$ and a reduced coercivity.

It is an advantage of the hard disk drive of the present invention that it includes a magnetic head of the present invention having a spin valve magnetoresistive read head having an increased $\Delta R/R$.

It is another advantage of the hard disk drive of the present invention that it includes a magnetic head of the present invention that includes a magnetoresistive read head having a reduced coercivity.

It is a further advantage of the hard disk drive of the present invention that it includes a magnetic head of the present invention that includes a three part $Al_2O_3$, NiMnO, NiFeCr seed layer.

It is yet another advantage of the hard disk drive of the present invention that it includes a magnetic head of the present invention that it includes a magnetoresistive read head including an NiFeCr seed layer portion having an improved upper surface crystalline structure that results in a spin valve sensor having an increased $\Delta R/R$ and a reduced coercivity.

It is an advantage of the method for fabricating a magnetic head of the present invention that it includes a spin valve sensor structure including an NiFeCr seed layer that is deposited to an excess thickness and subsequently etched back to a desired thickness, such that an improved crystal structure is created within a subsequently deposited spin valve structure, whereby an increased $\Delta R/R$ and reduced coercivity results.

The foregoing and other objects, features, and advantages of the present invention will be apparent from the following detailed description of the preferred embodiments which make reference to the several figures of the drawing.

IN THE DRAWINGS

FIG. 1 is a top plan view generally depicting a hard disk drive that includes a magnetic head of the present invention;

FIG. 2 is a side cross-sectional view depicting a typical prior art spin valve read head portion of a magnetic head;

FIG. 3 is a side cross-sectional view depicting typical thin film layers that may be utilized in fabricating the prior art spin valve sensor structure depicted in FIG. 2;

FIG. 4 is a side cross-sectional view depicting a first embodiment of a spin valve sensor structure of the present invention;

FIG. 5 is a side cross-sectional view depicting a preferred second embodiment of a spin valve sensor structure of the present invention;

FIG. 6 is a side cross-sectional view depicting an alternative spin valve sensor structure of the present invention; and FIG. 7 is a side cross-sectional view of a comparison spin valve sensor structure.

DETAILED DESCRIPTION OF THE PREFERRED EMBODIMENTS

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

A typical prior art magnetic head is fabricated to include a read head portion for reading data from the hard disk and a write head portion for writing to a hard disk, and FIG. 2 is a generalized depiction of a prior art read head portion of a magnetic head which will serve as a starting point for the description of the novel read head features of the present invention that follow. As depicted in FIG. 2, the read head portion 30 includes a first magnetic shield layer (S1) 34 that is fabricated upon the surface 38 of a substrate base 42. A first insulation layer (G1) 44 is fabricated upon the S1 shield 34 and a plurality of read head sensor layers 50 are then fabricated upon the G1 layer 46. A detailed description of the sensor layers 50 is provided hereinbelow, and the novel sensor layers of the present invention are then discussed. Using photolithographic and etching techniques, portions of the sensor layers are removed such that the central portions 50 depicted in FIG. 2 remain. Thereafter, hard bias elements 54 are fabricated next to the sensor layers 50, electrical leads 60 are fabricated upon the hard bias elements 54, a second electrical insulation layer (G2) 64 is deposited across the device followed by the fabrication of a second magnetic shield (S2) 68, and a write head portion (generally indicated as 72) is subsequently fabricated to complete the magnetic head fabrication process.

The present invention is directed towards improvements in the specific layers that comprise the sensor element 50 of the read head, and a more detailed depiction of a typical prior art spin valve sensor, such as may be utilized as sensor 50 in the prior art magnetic head of FIG. 2 is depicted in FIG. 3. As depicted in FIG. 3, a G1 electrical insulation layer 44 typically composed of $Al_2O_3$, is fabricated upon the S1 shield layer 34 followed by a three part seed layer composed of an $Al_2O_3$ layer 76, an NiMnO layer 80 and a Ta layer 84. Significantly, the composition of this type of three part seed layer is a focus of the present invention, as described in detail hereinbelow. Following the seed layer deposition, a standard spin valve layer structure 90 is fabricated. As will be seen herebelow, for purposes of comparison with the present invention, this identical spin valve layer structure 90 is utilized (as shown in FIGS. 4 and 5) to demonstrate the improved properties of the seed layers of the present invention.

As is seen in FIG. 3, the sequence of sensor layers in the spin valve layer structure 90 is PtMn, CoFe, Ru, CoFe, Cu, CoFe, NiFe, Cu, Ta, and the typical thickness of the various layers is set forth in FIG. 3. As is well known to those skilled in the art, the PtMn layer acts as an antiferromagnetic layer, the CoFe, Ru, CoFe layers act as a pinned magnetic layer, the Cu layer acts as a spacer layer, the CoFe, NiFe layers act as the free magnetic layer, the Cu layer acts as a spin filter layer and the Ta layer acts as a cap layer.

Spin valve sensors, such as are described herein, operate by detecting magnetic data bits written upon a hard disk through a change in electrical resistance within the spin valve sensor when the sensor is exposed to the magnetic field of the data bit. Specifically, the orientation of the free layer magnetic field is altered by the magnetic field of a data bit, and the change in the orientation of the free layer magnetic field creates a change in the electrical resistance of the sensor. The electrical resistance of the sensor is lowest when the free layer magnetic field is oriented parallel to the pinned layer magnetic field, and the resistance of the sensor increases when the free layer magnetic field is oriented other than parallel to the pinned layer magnetic field direction. Thus, an improved sensor (such as the present invention) will have a greater change in resistance when exposed to magnetic data bits, and this change in resistance is generally designated as $\Delta R$, where R is the sensor resistance when the free layer magnetic field is parallel to the pinned layer magnetic field, and $\Delta R$ is the change in resistance of the sensor when a data bit is read. The value $\Delta R/R$ basically is a representation of the percentage change in the sensor resistance, and it is utilized in comparing the qualities of spin valve sensors.

Another significant performance parameter for comparing sensor performance is the magnetic coercivity of the sensor, because the coercivity is a measure of the stability of the sensor, and the lower the coercivity of the sensor, the more stable it is. Therefore, it is a performance goal for the spin valve sensor of the present invention to have a higher $\Delta R/R$ and lower coercivity. As will appear from the following description the improved seed layer fabrication method for the spin valve of the present invention results in the creation of spin valve sensors having such a higher $\Delta R/R$ and a reduced coercivity.

FIG. 4 is a side cross-sectional view depicting a first spin valve sensor structure 92 of the present invention. The spin valve sensor structure 92 includes a three part seed layer including an $Al_2O_3$ layer 76, followed by an NiMnO layer 80, followed by an NiFeCr layer 94, and a standard spin valve layer structure 90 is fabricated on top of the three part seed layer. As with the prior art seed layer depicted in FIG. 3, the three part seed layer of the present invention depicted in FIG. 4 is fabricated in a vacuum system with multiple chambers where the three layers are sequentially deposited without exposure to atmosphere. A comparison of the spin valve sensor 92 of FIG. 4 with that of FIG. 3 reveals the single difference that the 35 Å Ta seed layer portion 84 of FIG. 3 has been replaced with a 20 Å NiFeCr seed layer 94. A comparison of the properties of the spin valve sensors depicted in FIGS. 3 and 4 is presented hereinbelow. A second and preferred embodiment of the spin valve sensor of the present invention can now be described with the aid of FIG. 5.

FIG. 5 is a side cross-sectional view depicting a preferred second embodiment of a spin valve sensor 96 of the present invention. The spin valve sensor 96 includes a three part seed layer, including an $Al_2O_3$ layer 76, an NiMnO layer 80 and an NiFeCr layer 98. A comparison of the spin valve sensor 96 of FIG. 5 with that of FIG. 4 reveals that the NiFeCr seed layer 98 of FIG. 5 has the same approximately 20 Å thickness as the NiFeCr seed layer 94 of FIG. 4. However, as is discussed herebelow, the performance parameters of the spin valve sensor of FIG. 5 are improved over those of the spin valve sensor of FIG. 4. This performance improvement is due to a different fabrication process for the NiFeCr seed layer 98 of the spin valve sensor 96 depicted in FIG. 5. Specifically, where the NiFeCr seed layer 94 of the spin valve of FIG. 4 was deposited to a thickness of 20 Å, the preferred NiFeCr seed layer 98 of the spin valve sensor of FIG. 5 was deposited to a thickness of approximately 30 Å and then etched back approximately 10 Å to a final thickness approximately of 20 Å. Thereafter, the PtMn layer and subsequent sensor layers 90, as shown in FIGS. 3 and 4 are fabricated identically on top of the etched back NiFeCr seed layer 98 of FIG. 5. The three part seed layer of spin valve sensor 96 is preferably fabricated in a vacuum system with multiple chambers, wherein the three parts 76, 80 and 98 of the seed layer are sequentially deposited by utilizing three sequential sputtering sources without exposure to atmosphere, followed by an ion beam etching step to etch back the NiFeCr layer 98. It is therefore to be understood that the single fabrication difference between the spin valve sensors depicted in FIGS. 4 and 5 is that the 20 Å thick NiFeCr seed layer 98 of FIG. 5 has been over deposited and subsequently etched back to a 20 Å thickness, whereas the NiFeCr seed layer of the spin valve of FIG. 4 was originally deposited to the 20 Å thickness. The etched back upper surface 100 (shown as a roughened line) of the NiFeCr seed layer 98 has an altered crystallographic surface, as compared to the deposited NiFeCr layer 94 of FIG. 4. It is believed by the inventor that the improved properties of the spin valve sensor depicted in FIG. 5 result from the alteration of the surface crystallography of the etched NiFeCr seed layer of FIG. 5, as compared to the deposited (without etch back) NiFeCr seed layer 94 of the spin valve sensor depicted in FIG. 4. The altered crystallography of the surface 100 then results in improved crystallography of the layers that are sequentially deposited on top of the surface 100.

For ease of comparison, the structures and performance characteristics of the three spin valve sensors depicted in FIGS. 3, 4 and 5, are presented in Table I.

TABLE I

| | | FIG. 3 | FIG. 4 | FIG. 5 |
|---|---|---|---|---|
| Sensor Layers | Ta | 40 Å | 40 Å | 40 Å |
| | Cu | 5 | 5 | 5 |
| | NiFe | 30 | 30 | 30 |
| | CoFe | 15 | 15 | 15 |
| | Cu | 20 | 20 | 20 |
| | CoFe | 26 | 26 | 26 |
| | RU | 8 | 8 | 8 |

TABLE I-continued

| | | FIG. 3 | FIG. 4 | FIG. 5 |
|---|---|---|---|---|
| | CoFe | 17 | 17 | 17 |
| | PtMn | 150 | 150 | 150 |
| Seed Layer | Etch | W & W/O | — | 30-10 |
| | Ta | 35 | — | — |
| | NiFeCr | — | 20 | 20 |
| | NiMnO | 30 | 30 | 30 |
| | $Al_2O_3$ | 30 | 30 | 30 |
| PERFORMANCE | R | 23.5 | 22.3 | 21.3 |
| CHARACTERISTICS | ΔR/R (%) | 8.6 | 8.63 | 9.05 |
| | Hc | 6.5 | 5.85 | 4.2 |
| | Hf | −5 | −0.8 | −8 |

As can be seen in Table I, each of the spin valve sensors depicted in FIGS. 3, 4 and 5 is represented in a data column. The specific indication (W&W/O) regarding etching of the Ta seed layer of the embodiment depicted in FIG. 3 means that experimental data was developed for devices wherein the Ta seed layer was etched and was not etched (that is, with and without surface etching). The experimental data results were that the performance characteristics were similar, meaning that the performance of the Ta seed layer spin valve sensor 50 was not appreciably enhanced by etching the surface of the Ta seed layer.

In comparing the performance characteristics of the sensors depicted in FIGS. 3 and 4, it is seen that ΔR/R is practically the same, whereas the coercivity Hc of the FIG. 4 disk is reduced. The reduction and coercivity is approximately 1 Oersted which can be of significance in some applications. Regarding the etched back NiFeCr seed layer sensor 96 of FIG. 5, it has a ΔR/R showing an approximately 5% increase, and a coercivity that shows an approximately 30% decrease from the FIG. 4 sensor. The parameter Hf in Table 1 relates to the ferromagnetic coupling field of the sensor, and as is known to those skilled in the art, a larger negative value for Hf is desirable for spin valve sensors of this type. Thus, it is seen that the spin valve sensor 92 of FIG. 4 provides some improvement over the prior art, while the preferred sensor embodiment depicted in FIG. 5 possesses significantly improved performance characteristics due to the depositing and subsequent etching back of its NiFeCr seed layer. Specifically, 20 Å NiFeCr seed layer 94 of the FIG. 4 sensor lacks some of the improved performance characteristics of the etched back 20 Å NiFeCr seed layer 98 of the preferred embodiment sensor depicted in FIG. 5.

With regard to preferred ranges for the deposited NiFeCr seed layer thickness and preferred ranges for etching back the NiFeCr seed layer, it appears that the improvements in performance characteristics of the present invention can be obtained where the NiFeCr seed layer 98 is initially deposited from approximately 15 Å to approximately 45 Å, and the etching back of the seed layer is conducted from approximately 5 Å to approximately 15 Å. A final thickness range of the NiFeCr seed layer 98 is from approximately 10 Å to approximately 40 Å. A preferred final thickness range of the NiFeCr seed layer 98 is from approximately 15 Å to approximately 35 Å, and a preferred final thickness of the NiFeCr seed layer 98 is approximately 20 Å. With regard to the composition of the NiFeCr seed layer, the preferred embodiment utilizes the approximate composition $Ni_{49.5}Fe_{12.5}Cr_{38}$ at. % composition, while acceptable results are obtained with seed layers in which the Cr concentration may vary from 35% to 46%.

The etched back NiFeCr seed layer 98 has been shown to provide increased performance results for different types of spin valve layer structures, as are known to those skilled in the art, and FIG. 6 depicts a spin valve sensor 110 having the etched back NiFeCr seed layer 98 and a layer structure 114 including two pinned layers. As will be understood by those skilled in the art, the spin valve sensor 110 depicted in FIG. 6 includes a PtMn antiferromagnetic layer, a CoFe, Ru, CoFe pinned layer, a first Cu spacer layer, a CoFe, NiFe, CoFe free layer, a second Cu spacer layer, a second CoFe, Ru, CoFe pinned layer, a second PtMn antiferromagnetic layer and a Ta cap.

TABLE II

| | | FIG. 6 | FIG. 7 |
|---|---|---|---|
| Sensor Layers | Ta | 50 | 50 |
| | PtMn | 150 | 150 |
| | CoFe | 17 | 17 |
| | RU | 8 | 8 |
| | CoFe | 26 | 26 |
| | Cu | 20 | 20 |
| | CoFe | 10 | 10 |
| | NiFe | 10 | 10 |
| | CoFe | 10 | 10 |
| | Cu | 20 | 20 |
| | CoFe | 26 | 26 |
| | RU | 8 | 8 |
| | CoFe | 17 | 17 |
| | PtMn | 150 | 150 |
| Seed Layer | Etch | 30-10 | W&W/O |
| | Ta | — | 35 |
| | NiFeCr | 20 | — |
| | NiMnO | 30 | 30 |
| | Al$_2$O$_3$ | 30 | 30 |
| PERFORMANCE CHARACTERISTICS | R | 14.5 | 14.5 |
| | ΔR/R(%) | 12.5 | 12 |
| | Hc | 7.0 | 10 |
| | Hf | −15 | −10 |

Analysis of the performance characteristics of the spin valve sensor depicted in FIG. 6 is presented in Table II and reveals a ΔR/R of 12.5, and Hc of 7, and an Hf of −15. FIG. 7 depicts a spin valve sensor 120 that is similar to that depicted in FIG. 6, but wherein the etched back NiFeCr seed layer 98 of FIG. 6 was replaced with a Ta seed layer 124. The experimental results for the sensor of FIG. 7 are presented in Table II and reveal a sensor having a ΔR/R of 12, an HC of 10, and an Hf of −10. It can therefore be seen that the etched back NiFeCr seed layer 98 of the present invention, as depicted in FIGS. 5 and 6, provides improved performance characteristics for PtMn spin valve sensors generally.

While the present invention has been shown and described with regard to certain preferred embodiments, it is to be understood that those skilled in the art will no doubt develop certain alterations and modifications in form and detail therein. It is therefore intended that the following claims cover all such alterations and modifications that nevertheless include the true spirit and scope of the present invention.

What I claim is:

1. A method for fabricating a magnetic head including a spin valve sensor, comprising the steps of:

fabricating a first electrical insulation layer (G1) above a first magnetic shield layer (S1);

fabricating a plurality of spin valve sensor layers above said G1 layer, said spin valve sensor layers including a seed layer, a PtMn antiferromagnetic layer, at least one pinned magnetic layer and at least one free magnetic layer;

wherein said seed layer is comprised of Al$_2$O$_3$, NiMnO, NiFeCr seed layer portions;

wherein said NiFeCr seed layer portion is fabricated by depositing it to a first thickness and subsequently etching it back to a final thickness before the fabrication of said PtMn layer such that said NiFeCr seed layer portion is formed with an etched upper surface; and wherein said PtMn antiferromagnetic layer is fabricated directly upon said etched upper surface of said NiFeCr seed layer portion.

2. A method for fabricating a magnetic head as described in claim 1 wherein said NiFeCr seed layer portion is fabricated to have a final thickness of from approximately 10 Å to approximately 40 Å.

3. A method for fabricating a magnetic head as described in claim 2 wherein said NiFeCr seed layer portion is fabricated to have a final thickness of from approximately 15 Å to approximately 35 Å.

4. A method for fabricating a magnetic head as described in claim 3 wherein said NiFeCr seed layer portion is fabricated to have a final thickness of approximately 20 Å.

5. A method for fabricating a magnetic head as described in claim 1 wherein said first thickness of said NiFeCr seed layer portion is from approximately 15 Å to approximately 45 Å and it is etched back a thickness of from approximately 5 Å to approximately 15 Å.

6. A method for fabricating a magnetic head as described in claim 5 wherein said first thickness is approximately 30 Å and said final thickness is approximately 20 Å.

7. A method for fabricating a magnetic head as described in claim 1 wherein said spin valve sensor layers include at least one pinned magnetic layer having a composition including CoFe and at least one spacer layer having a composition including Cu, and at least one free magnetic layer having a composition including NiFe.

8. A method for fabricating a magnetic head as described in claim 1 wherein the Cr concentration of said NiFeCr seed layer portion is from approximately 35 at. % to approximately 46 at. %.

9. A method for fabricating a magnetic head as described in claim 8 wherein the Cr concentration of said NiFeCr seed layer portion is approximately 38 at. %.

10. A method for fabricating a magnetic head as described in claim 9 wherein the composition of said NiFeCr seed layer portion is approximately Ni$_{49.5}$Fe$_{12.5}$Cr$_{38}$.

11. A method for fabricating a magnetic head as described in claim 1 wherein said first thickness is from 15 to 45 Å, and it is etched back a thickness of from 5 to 15 Å, and wherein the Cr concentration of said NiFeCr seed layer portion composition is from approximately 35 at. % to approximately 46 at. %.

* * * * *